(12) United States Patent
Liu et al.

(10) Patent No.: US 7,661,422 B2
(45) Date of Patent: Feb. 16, 2010

(54) SOLAR AIR CONDITIONING DEVICE

(75) Inventors: Tay-Jian Liu, Taipei Hsien (TW); Xin-Jian Xiao, Shenzhen (CN)

(73) Assignees: Fu Zhun Precision Industry (Shen Zhen) Co., Ltd., Shenzhen, Guangdong Province (CN); Foxconn Technology Co., Ltd., Tu-Cheng, Taipei Hsien (TW)

( * ) Notice: Subject to any disclaimer, the term of this patent is extended or adjusted under 35 U.S.C. 154(b) by 7 days.

(21) Appl. No.: 11/964,561

(22) Filed: Dec. 26, 2007

(65) Prior Publication Data

US 2008/0302355 A1    Dec. 11, 2008

(30) Foreign Application Priority Data

Jun. 8, 2007    (CN) .................. 2007 1 0074783

(51) Int. Cl.
  *F24J 2/04*     (2006.01)
  *F24F 7/00*     (2006.01)
  *F24J 2/20*     (2006.01)
  *F24J 2/22*     (2006.01)
  *F24J 3/06*     (2006.01)

(52) U.S. Cl. .................. 126/629; 126/634; 126/648; 126/651; 126/655

(58) Field of Classification Search .................. 126/570, 126/621, 623, 627, 628, 629, 651, 654, 655, 126/658, 663, 664, 666, 667, 669, 705, 709; 138/111–117, 156, 166; 159/903, 904; 165/48.1, 165/48.2

See application file for complete search history.

(56) References Cited

U.S. PATENT DOCUMENTS

| 246,626 A | * | 9/1881 | Morse .................. 126/628 |
| 1,622,664 A | * | 3/1927 | Murray et al. .............. 138/117 |
| 4,112,922 A | * | 9/1978 | Skinner et al. .............. 126/664 |
| 4,114,597 A | * | 9/1978 | Erb .......................... 126/665 |
| 4,217,887 A | * | 8/1980 | Hoffman et al. ............. 126/664 |
| 4,222,373 A | * | 9/1980 | Davis ......................... 126/664 |
| 4,245,620 A | * | 1/1981 | Heinemann .................. 126/662 |
| 4,294,786 A | * | 10/1981 | Graham et al. .............. 264/46.4 |
| 4,297,989 A | * | 11/1981 | Wozny et al. ................ 126/648 |

(Continued)

FOREIGN PATENT DOCUMENTS

WO    WO 9625632 A1 *  8/1996

(Continued)

*Primary Examiner*—Steven B McAllister
*Assistant Examiner*—Daniel E Namay
(74) *Attorney, Agent, or Firm*—Frank R. Niranjan

(57) ABSTRACT

A solar air conditioning device (100) comprises a solar collector assembly (30), an inlet assembly (10) at an entrance of the solar collector assembly, and an outlet assembly (50) at an exit of the solar collector assembly. The solar collector assembly includes a heat-absorbing set (31) and a transparent panel (38) being assembled to a top of the heat-absorbing set. The heat-absorbing set comprises a plurality of heat-absorbing units (32) engaged with each other. A distance between the inlet assembly and the outlet assembly is equal to a longitudinal length of single heat-absorbing unit. The heat-absorbing set defines an air channel with the transparent panel and a heat-absorbing channel below the air channel. The inlet and outlet assemblies are in fluidic communication with the heat-absorbing channel.

9 Claims, 19 Drawing Sheets

U.S. PATENT DOCUMENTS

| | | | |
|---|---|---|---|
| 4,308,858 A * | 1/1982 | Skillman | 126/570 |
| 4,392,483 A * | 7/1983 | Koenig | 126/650 |
| 4,418,685 A * | 12/1983 | Frazier | 126/628 |
| 4,426,999 A * | 1/1984 | Evans et al. | 126/669 |
| 4,607,616 A * | 8/1986 | Lehmann | 126/669 |
| 4,774,932 A * | 10/1988 | Hollick | 126/632 |
| 4,934,338 A * | 6/1990 | Hollick et al. | 126/622 |
| 5,145,287 A * | 9/1992 | Hooper et al. | 405/262 |
| 5,161,519 A * | 11/1992 | Christian | 126/629 |
| 5,339,798 A * | 8/1994 | Christian | 126/629 |
| 5,480,494 A * | 1/1996 | Inoue | 136/251 |
| 5,497,587 A * | 3/1996 | Hirai et al. | 52/173.3 |
| 5,572,988 A * | 11/1996 | Walton | 126/652 |
| 5,673,524 A * | 10/1997 | Gailey | 52/309.9 |
| 6,063,996 A * | 5/2000 | Takada et al. | 136/246 |
| 6,201,179 B1 * | 3/2001 | Dalacu | 136/244 |
| 6,543,188 B1 * | 4/2003 | Poma et al. | 52/78 |
| 6,694,692 B2 * | 2/2004 | Piccone | 52/426 |
| 6,800,801 B2 * | 10/2004 | Sasaoka et al. | 136/246 |
| 6,880,553 B2 * | 4/2005 | Liu et al. | 126/628 |
| 7,063,126 B1 * | 6/2006 | Morris | 165/53 |
| 7,182,551 B2 * | 2/2007 | Moreau | 405/274 |
| 7,484,507 B2 * | 2/2009 | Nikiforov et al. | 126/628 |
| 2002/0032000 A1 * | 3/2002 | Lawless et al. | 454/365 |
| 2003/0140560 A1 * | 7/2003 | Poma et al. | 49/67 |
| 2004/0211144 A1 * | 10/2004 | Stanchfield | 52/578 |

FOREIGN PATENT DOCUMENTS

WO    WO 0284182 A1 * 10/2002

* cited by examiner

SOLAR AIR CONDITIONING DEVICE

CROSS-REFERENCE TO RELATED APPLICATION

This application is related to U.S. patent application Ser. No. 11/776,906 filed on Jul. 26, 2007 and entitled "SOLAR AIR CONDITIONING DEVICE"; the co-pending U.S. patent application is assigned to the same assignee as the instant application. The disclosure of the above-identified application is incorporated herein by reference.

BACKGROUND OF THE INVENTION

1. Field of the Invention

The present invention relates to air conditioning devices, and particularly, to an air conditioning device using solar energy to heat air.

2. Description of Related Art

With increasing $CO_2$ emissions, the risk of global climate becomes abnormal and ecological destruction may increase. As a result, industrialized countries have again become aware of the urgency to reduce their dependence on fossil fuels after the energy crisis in the 70's. Therefore, it has become important to develop new environmental friendly energy resources, and to replace devices using non-renewable energy resources, such as air-conditioners, with devices using renewable energy. The conventional air conditioning devices not only need more energy, but also require refrigerant which can be harmful to the environment. Consequently, these countries have given positive commitments to use solar energy more effectively. Though people still have reservations about whether solar energy will be able to replace other energy resources in the near future, one thing that is almost certain is that solar energy will be playing a very important role in a number of fields, especially air ventilation and heating in structures such as buildings and vehicles.

As far as an air conditioning device using solar energy for heating and air ventilation is concerned, solar collectors are a key part in such a device, and it has to be mounted at an outside location where sufficient sunlight can be collected, such as on a roof or wall. In the past, a lot of effort has been made to develop solar collectors with different functions and styles. Many of them have been disclosed in patent literature. The most typical example is fixing a glass panel or transparent panel onto a fixed outer frame of a heat-insulated chamber and passing fluid through black heat-absorbing plates or pipes installed inside the chamber, so as to absorb solar energy. Examples include the solar hot water supply system disclosed in U.S. Pat. No. 4,418,685, the air ventilation facility disclosed in WO 9,625,632, the roof-style air ventilation facility disclosed in US No. 2002/0,032,000A1, and the wall-style air preheater disclosed in U.S. Pat. No. 4,934,338. However, the solar collectors used presently still have some drawbacks. Therefore, there is much room for improvements in applying and promoting the usage of solar energy to save energy and facilitate air conditioning. The aforementioned drawbacks include:

(1) The related solar collector is too heavy. Its long-term use may cause an overly heavy load on the bearing structure.
(2) Solar-thermo conversion efficiency may be limited.
(3) The structure of the related solar collector is complicated, which makes its installation and maintenance difficult. And thus prolongs the return period.
(4) The related solar heating device has poor compatibility and flexibility to match different bearing structures. Very often, it has to be custom-made.
(5) The contour of the solar collector is obtrusive and often impairs the aesthete and harmony of the overall appearance of the bearing structure.
(6) The packaging needed for the collector takes up much space and increases the cost of storage, display, and marketing.
(7) The integral assembly of the whole-unit product is bulky, making it difficult to use in large-area application and increases installation cost.
(8) Glass or transparent panels are glazed onto the outer frame of a heat-insulated chamber. Different thermal expansion coefficients of materials may cause thermal stress problems.
(9) The related design is so complicated as to be difficult for an untrained user to install.
(10) Some of the related designs can only be applicable to the structures which are under construction and designed to allow its installation. For most existing structures, the designs are unsuitable.
(11) When air passes over a glazed panel, heat is dissipated unless double-glazing is used, but it is expensive and troublesome.
(12) Hot water supply systems or liquid systems operated by solar heating experience problems due to freezing and leakage of the working liquid.

Related solar air conditioning devices include that disclosed in U.S. Pat. No. 6,880,553. Heat-absorbing units of the solar air conditioning device of U.S. Pat. No. 6,880,553 are connected in a fixed way, however it is difficult to extend the area of the solar air conditioning device in a convenient way so that the solar air conditioning device can be used in different applications.

It is therefore desirable to provide a solar air conditioning device that can be flexibly extended and used in different applications.

SUMMARY OF THE INVENTION

A solar air conditioning device comprises a solar collector assembly, an inlet assembly installed at an entrance of the solar collector assembly, and an outlet assembly installed at an exit of the solar collector assembly. The solar collector assembly includes a heat-absorbing set and a transparent panel being assembled to a top of the heat-absorbing set. The heat-absorbing set comprises a plurality of heat-absorbing units. The heat-absorbing units are engaged with each other.

The heat-absorbing units can be assembled together in a flexible way via fasteners and fixtures formed on each of the heat-absorbing units. Thus, the solar air conditioning assembly can be used in many different applications.

The solar air conditioning device can heat stale air guided from exhaust pipes connecting with a room requiring cooling and expel the hot stale air out of the structure by thermal buoyancy. Cool and fresh air outside can be guided to the room requiring cooling, or air from outside can be cooled and guided into the room requiring cooling. Thus, the solar air conditioning device can be used as an air conditioning system.

According to concept of a modular design, the solar air conditioning assembly provides users with a boarder range of applications. Moreover, the solar air conditioning assembly provides users with more selection and freedom in assembly. The solar air conditioning assembly can be installed horizontally or vertically attached to walls. Furthermore, it can be installed obliquely. The solar air conditioning assembly can also provide excellent heat insulation and protection to structures.

The heat-absorbing units used in the solar air conditioning assembly can be flexibly expanded as desired to the most optimal absorption surface areas to fully absorb and collect energy. Therefore, the solar air conditioning assembly does not need a fixed outer frame insulation chamber like the one used in the related solar air conditioning assembly. The solar air conditioning assembly also needs no special consideration for the heat efficiency of each individual unit, as related models do.

The solar air conditioning assembly only need one layer of transparent panel; because most of the air goes through the lower heat-absorbing channels, the assembly has the excellent insulation effect of a double-glazed system and a very high heat-absorption efficiency.

The solar air conditioning assembly is designed according to a modular concept. Cost of the solar air conditioning assembly is greatly reduced as the heat-absorbing units are made of thin boards and plates. The solar air conditioning assembly is much simpler than the related assemblies with a one piece unit design. The assembly not only reduces cost in packaging but also requires less room for display and storage thus making marketing much easier. The solar air conditioning assembly is very easy to install and maintain, so users can install or assemble the system by themselves.

The solar air conditioning assembly is operated and powered by solar energy and therefore does not rely on an electrical power source and does not need a refrigerant. Furthermore, the solar air conditioning assembly having modular heat-absorbing units can be increased in size to fit different conditions and function requirements.

Other advantages and novel features of the present invention will become more apparent from the following detailed description of preferred embodiment when taken in conjunction with the accompanying drawings.

BRIEF DESCRIPTION OF THE DRAWINGS

Many aspects of the present solar air conditioning device can be better understood with reference to the following drawings. The components in the drawings are not necessarily drawn to scale, the emphasis instead being placed upon clearly illustrating the principles of the present driving device. Moreover, in the drawings, like reference numerals designate corresponding parts throughout the several views.

DETAILED DESCRIPTION OF THE INVENTION

Figure 1:
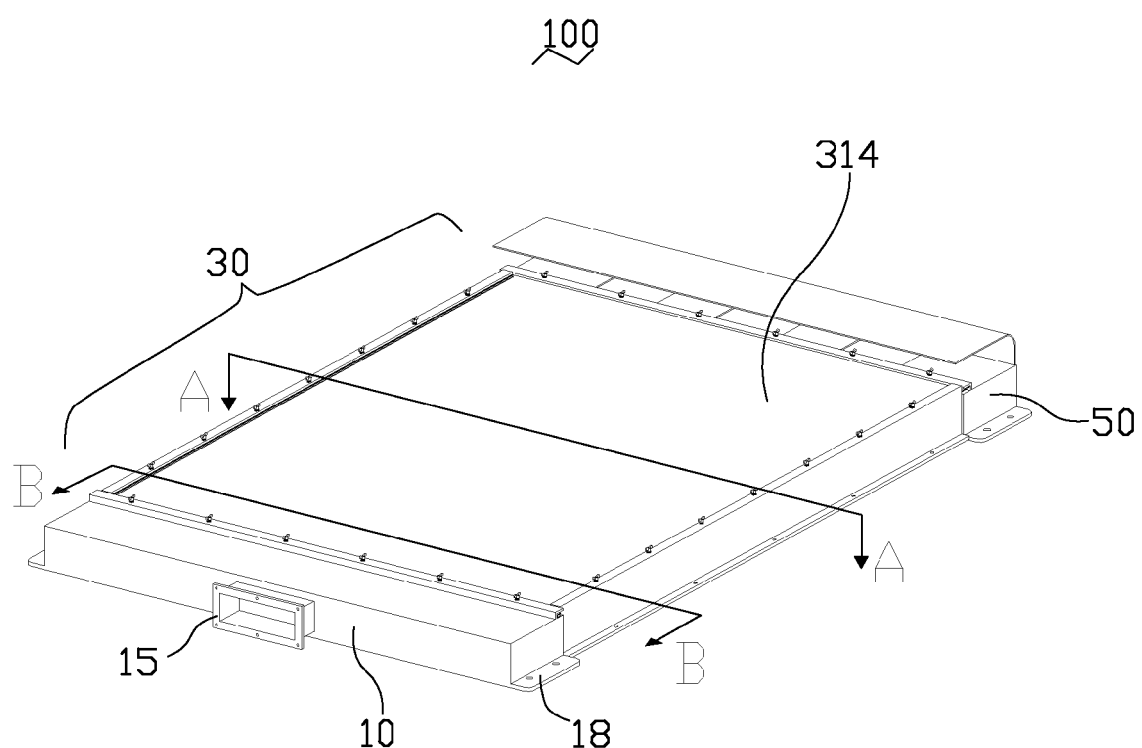
FIG. 1 is an assembled, schematic view of a solar air conditioning device in accordance with the preferred embodiment of the present invention.
Figure 2:
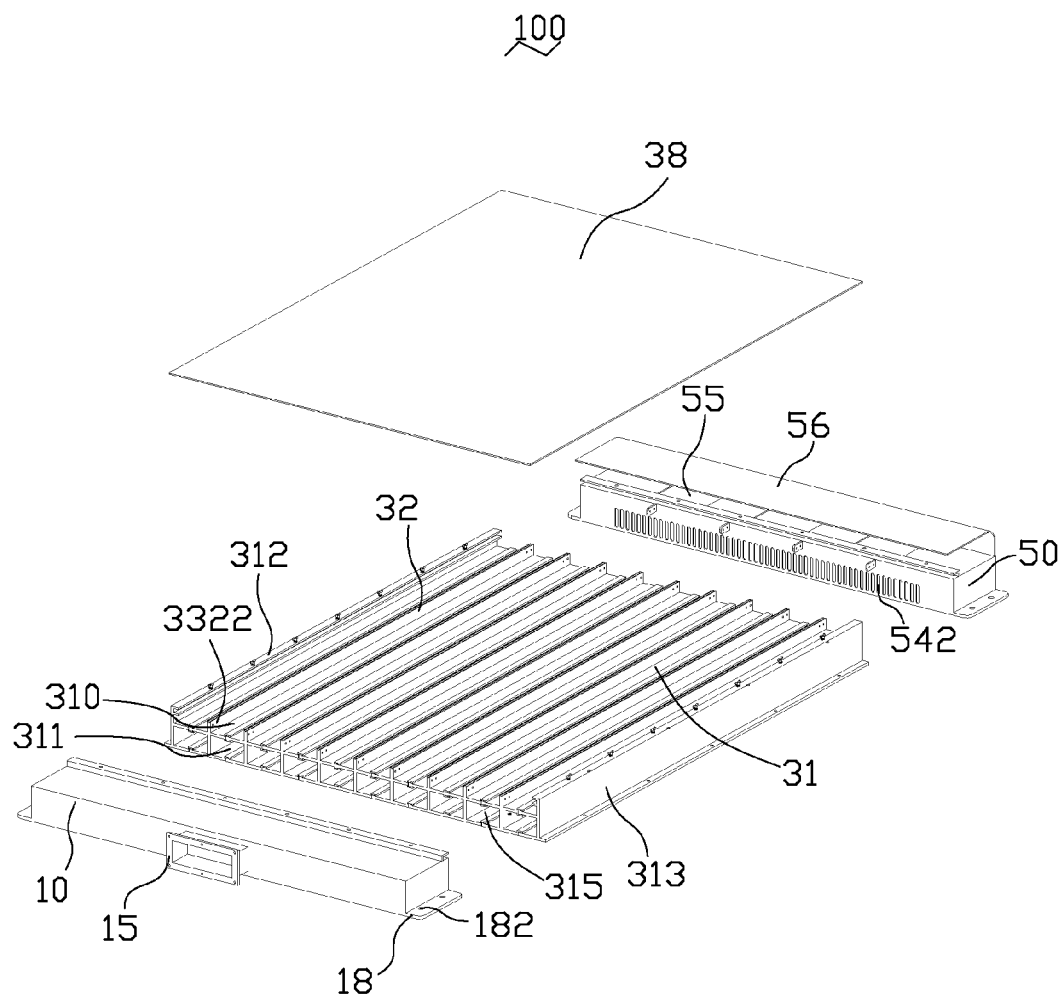
FIG. 2 is an exploded, schematic view of the solar air conditioning device in FIG. 1.

Referring to FIG. 1 and FIG. 2, a solar air conditioning device 100 in accordance with the present invention is shown. The air conditioning device 100 comprises a solar collector assembly 30, an inlet assembly 10, and an outlet assembly 50. The solar collector assembly 30 comprises a heat-absorbing set 31 and a transparent panel 38. The heat-absorbing set 31 has a plurality of heat-absorbing channels 315. The heat-absorbing set 31 is used for absorbing solar energy to heat air through the heat-absorbing channels 315. The heat-absorbing set 31 comprises a plurality of modular heat-absorbing units 32 which are connected with each other. The heat-absorbing units 32 are made of good thermal conductivity materials with black surface. The heat-absorbing units 32 are manufactured by aluminum extrusion. Then they are subjected to surface treatment of anode oxidation and black coloring. The solar collector assembly 30 defines a plurality of upper heat-retention cavities 310 and a plurality of lower heat-absorbing cavities 311 by the heat-absorbing units 32 and the transparent panel 38.

Figure 3:
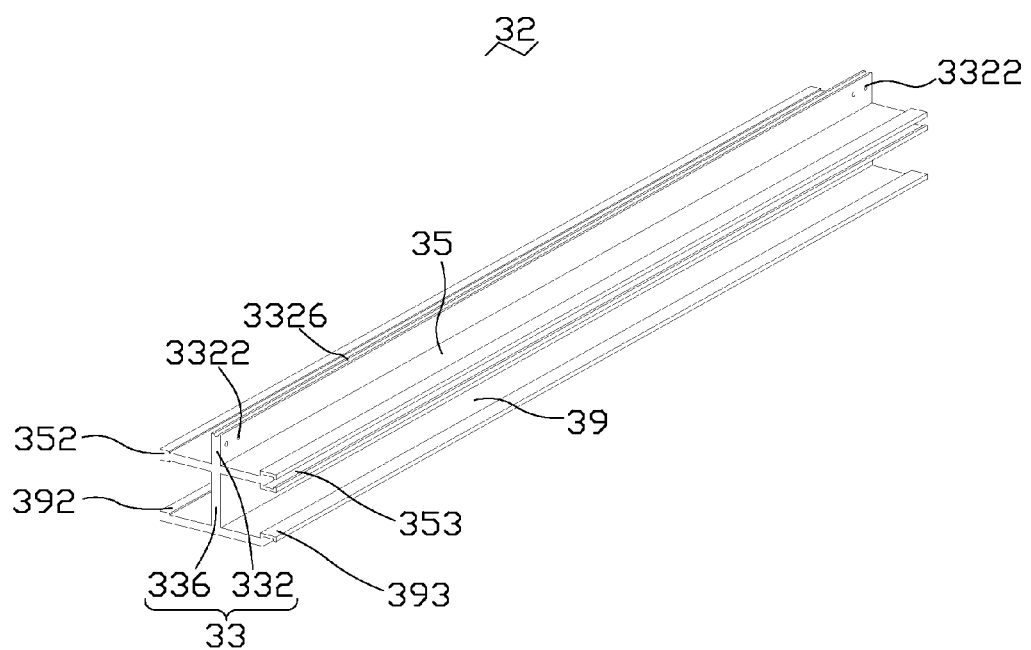
FIG. 3 is a schematic view of a heat-absorbing unit used in the air conditioning device in FIG. 1.

Referring to FIG. 3, a heat-absorbing unit 32 of the air conditioning device 100 is shown. The heat-absorbing unit 32 comprises a heat-absorbing plate 35, a bottom board 39 parallel to the heat-absorbing plate 35 and a support board 33 integrally formed from a piece of aluminum stock. The support board 33 is perpendicularly connected with the heat-absorbing plate 35 and the bottom board 39. The support board 33 is divided into an upper support board 332 above the heat-absorbing plate 35 and a lower support board 336 below the heat-absorbing plate 35. The heat-absorbing units 32 are thin and handy for displaying, packaging, storage, transportation and assembly. The heat-absorbing plate 35 in a side of the support board 33 can be designed to have a different transverse length and a same longitudinal length to that of the bottom board 39 on a same side. Two mounting holes 3322 are respectively defined in two longitudinal sides of the upper support board 332.

For conveniently increasing quantity of the heat-absorbing units 32 included in the solar collector assembly 30, each heat-absorbing unit 32 further comprises two fasteners 352, 353 and two fixtures 392, 393. The fasteners 352, 353 are formed from two opposite sides of the heat-absorbing plate 35. The fixtures 392, 393 are formed from two opposite sides of the bottom board 39. The fastener 353 and the fixture 393 are shaped to be rectangular grooves. The fastener 352 and the fixture 392, which can be respectively engaged with the fastener 353 and the fixture 393 of an adjacent heat-absorbing unit 32, are shaped to be rectangular rods. A height of the upper support board 332 is equal to that of the heat-retention cavities 310. A height of the lower support board 336 is equal to that of the heat-absorbing cavities 311. The upper support board 332 defines longitudinal recesses 3326 at a top surface for receiving corresponding seal gaskets 40 (shown in FIG. 9). Accordingly, the heat-absorbing units 32 are engaged with each other by means of the fasteners 352, 353 and the fixtures 392, 393, thus forming a transverse column of heat-absorbing units 32. In a longitudinal direction, a distance between the inlet assembly 10 and the outlet assembly 50 is equal to a longitudinal length of the support board 33 of single heat-absorbing unit 32.

Figure 4:
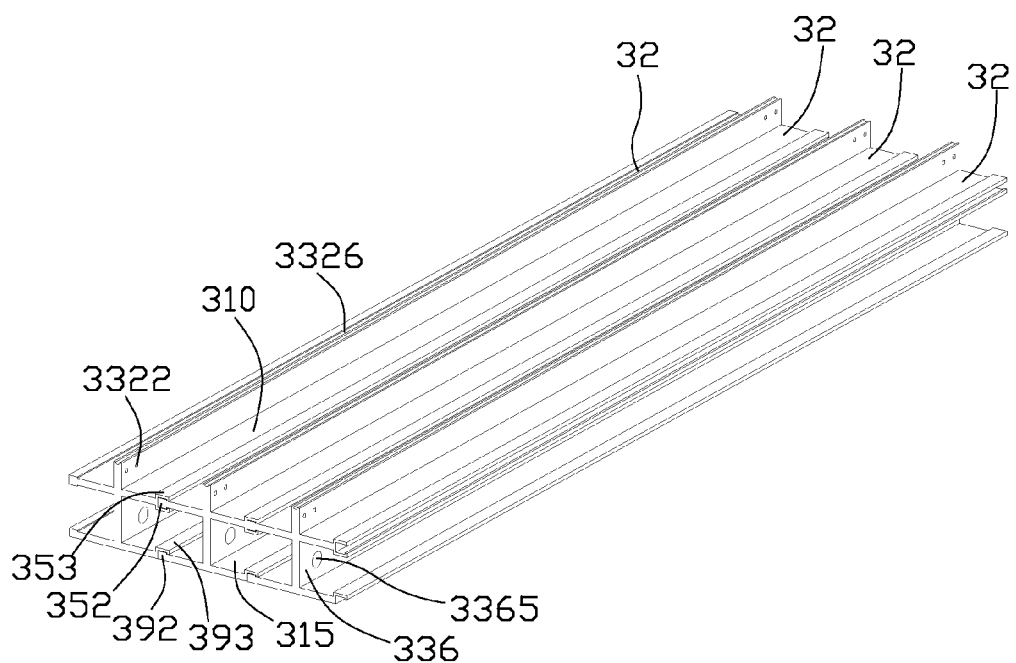
FIG. 4 is an assembled, schematic view of three of the heat-absorbing units in FIG. 3 assembled together.

Referring to FIG. 4, three heat-absorbing units 32 are connected with each other in the transverse direction by means of the fasteners 352 engaging with the fasteners 353 and the fixtures 392 engaging with the fixtures 393. Thus, air in the heat-retention cavities 310 does not become mixed with the heat-absorbing cavities 311. The lower support board 336 defines a plurality of air holes 3365 for improving heat absorbing efficiency of the heat-absorbing cavities 311.

Figure 5A:
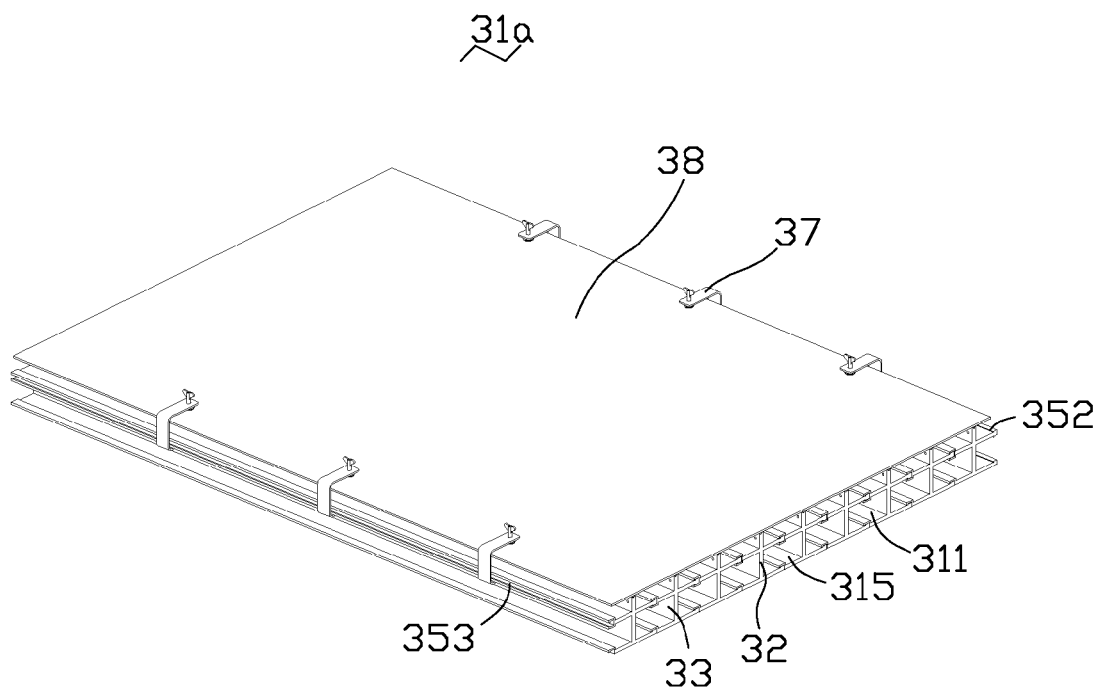
FIG. 5(A) is a schematic view of a heat-absorbing set of the solar air conditioning device of FIG. 1 in accordance with a second embodiment of the present invention.

Referring to FIG. 4 and FIG. 5(A), a heat-absorbing set 31a in accordance with a second embodiment of the present invention is shown. The solar air conditioning devices 100 configured with a flat transparent panel 38. The transparent panel 38 rests on tops of the heat-absorbing set 31a engaging with the heat-absorbing units 32. In order to prevent water from entering into the solar collector assembly 30 from the two opposite sides of the transparent panel 38 and the heat-absorbing set 31a along the heat-absorbing channels 315, the seal gaskets 40 are engaged in the recesses 3326 of the support board 33. The solar collector assembly 30 further comprises a plurality of U-shaped clamps 37. To obtain a better effect, an end of the C-shaped clamps 37 can engage with the fasteners 352, 353 of the heat-absorbing unit 32. Another end of the C-shaped clamps 37 can be first attached to a steel bar (not shown); accordingly, a soft gasket (not shown) should be located between the steel bar and the transparent panel 38. Thus, the transparent panel 38 can be supported more uniformly and the heat-absorbing set 31 a can have better waterproofing.

Figure 5B:
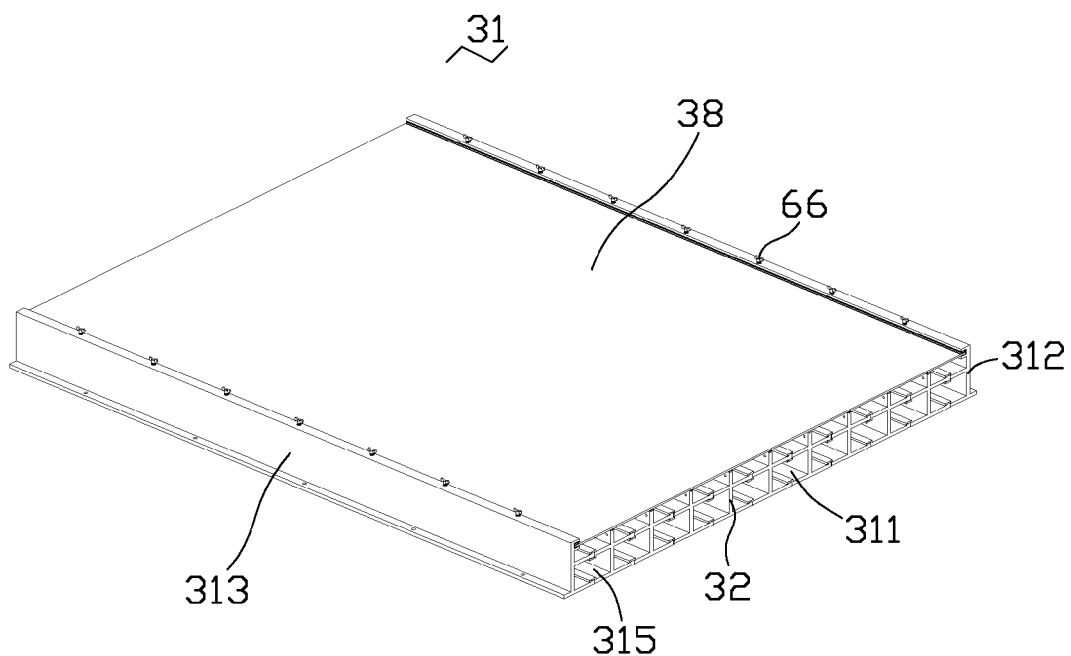
FIG. 5(B) is a schematic view of the heat-absorbing set of the solar air conditioning device of FIG. 1 in accordance with the present invention.
Figure 6A:
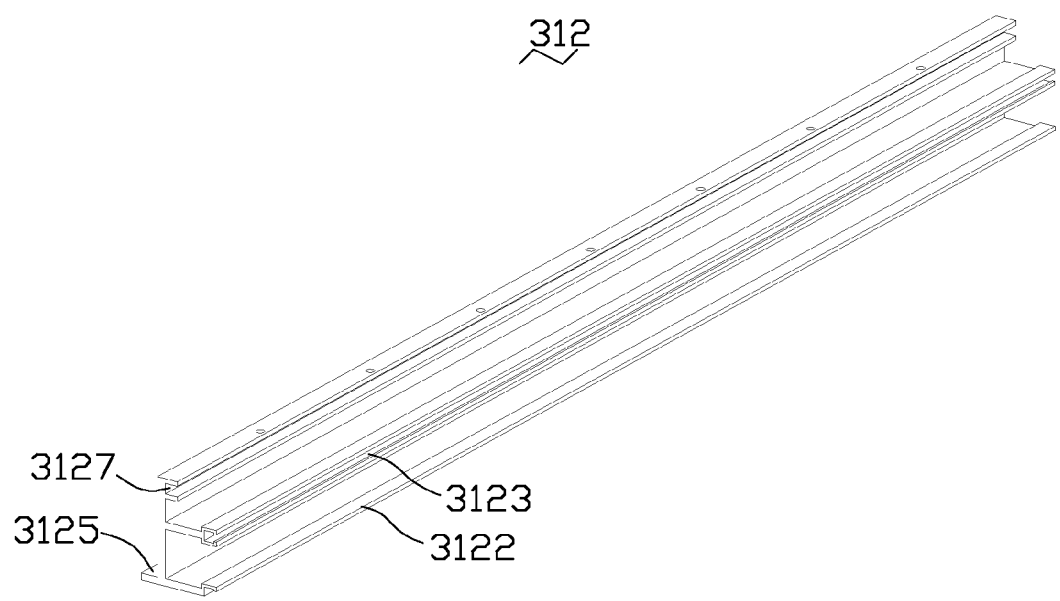
FIG. 6(A) is a schematic view of a baffle member of FIG. 5(B) in accordance with the present invention.
Figure 6B:
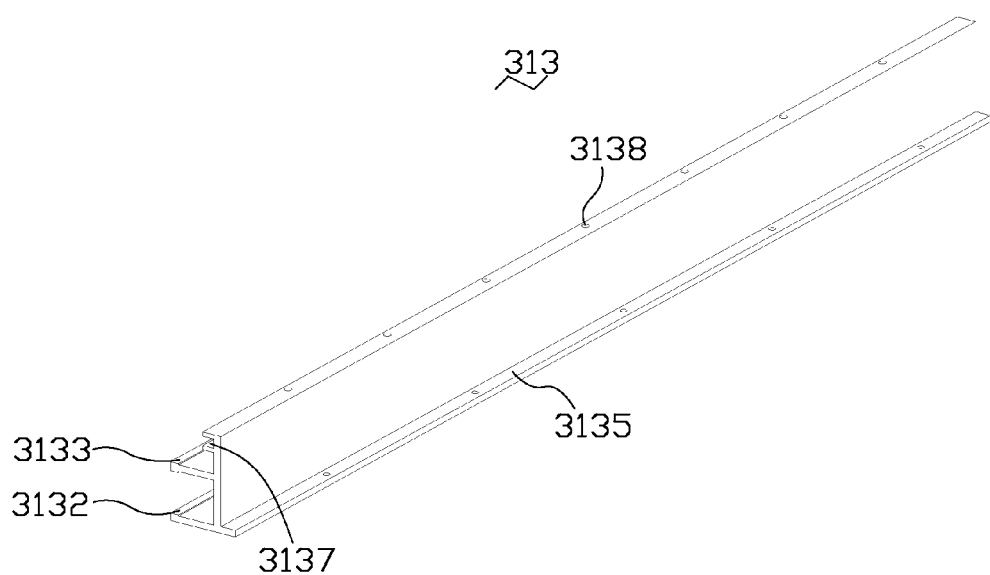
FIG. 6(B) is a schematic view of another baffle member of FIG. 5(B) in accordance with the present invention.
Figure 7:
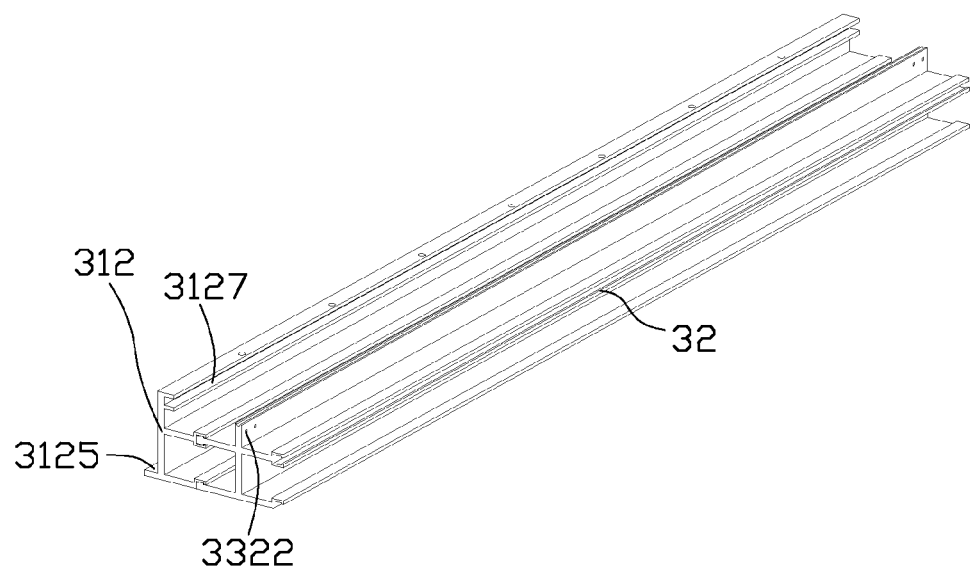
FIG. 7 is a schematic view of an assembly of the baffle member of FIG. 5(B) and a corresponding heat-absorbing unit in accordance with the present invention.
Figure 8:
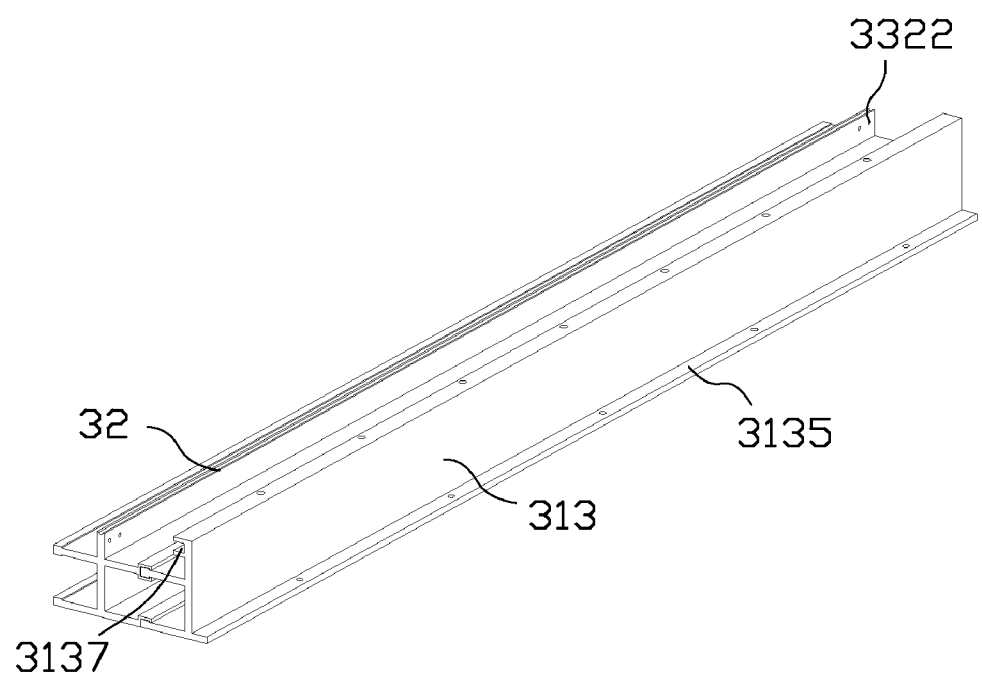
FIG. 8 is a schematic view of an assembly of another baffle member of FIG. 5(B) and a corresponding heat-absorbing unit in accordance with the present invention.

Referring to FIG. 5(B), the heat-absorbing set 31 of FIG. 1 is shown. A difference between the heat-absorbing set 31 and the heat-absorbing set 31a of FIG. 5(A) is that two baffle members 312, 313 are mounted on opposite two sides of the heat-absorbing set 31 to further improve ability of waterproofing of the heat-absorbing set 31. Thus, the heat-absorbing set 31 is enclosed by the baffle members 312, 313 and the inlet and outlet assemblies 10, 50.

Referring to FIGS. 6(A)-6(B) and FIGS. 7-8, the baffle member 312 comprises a fastener 3123 and a fixture 3122. The fastener 3123 has a same configuration as that of the fastener 353 of the heat-absorbing unit 32. The fixture 3122 has a same configuration as that of the fixture 393 of the heat-absorbing unit 32. The fastener 3123 and the fixture 3122 are formed a same side of the baffle member 312 orienting to the heat-absorbing set 31, for engaging with the corresponding fastener 352 and fixture 392 of the heat-absorbing unit 32 located at an outmost of a transverse side of the heat-absorbing set 31. A protruding recess 3127 located above the fastener 3123 is defined at the same side of the baffle member 312 orienting to the heat-absorbing set 31 for providing an insertion of an edge of the transparent panel 38. A connecting plate 3125 extends horizontally from a bottom of the baffle member 312 located at opposite side of the heat-absorbing unit 32 relative to the fastener 3123 for fixing the solar collector assembly 30 to a roof, a wall or a fixed board. The baffle member 313 comprises a fastener 3133 and a fixture 3132. The fastener 3133 has a same configuration as that of the fastener 352 of the heat-absorbing unit 32. The fixture 3132 has a same configuration as that of the fixture 392 of the heat-absorbing unit 32. The fastener 3133 and the fixture 3132 are formed a same side of the baffle member 313 orienting to the heat-absorbing set 31, for engaging with the corresponding fastener 353 and fixture 393 of the heat-absorbing unit 32 located at an outmost of another opposite transverse side of the heat-absorbing set 31. A protruding recess 3137 located above the fastener 3133 is defined at the same side of the baffle member 313 orienting to the heat-absorbing set 31 for providing an insertion of an opposite edge of the transparent panel 38. A plurality of fixing holes 3138 is defined at a top of the baffle member 313. A connecting plate 3135 extends horizontally from a bottom of the baffle member 313 located at opposite side of the heat-absorbing unit 32 relative to the fastener 3123.

Figure 9:
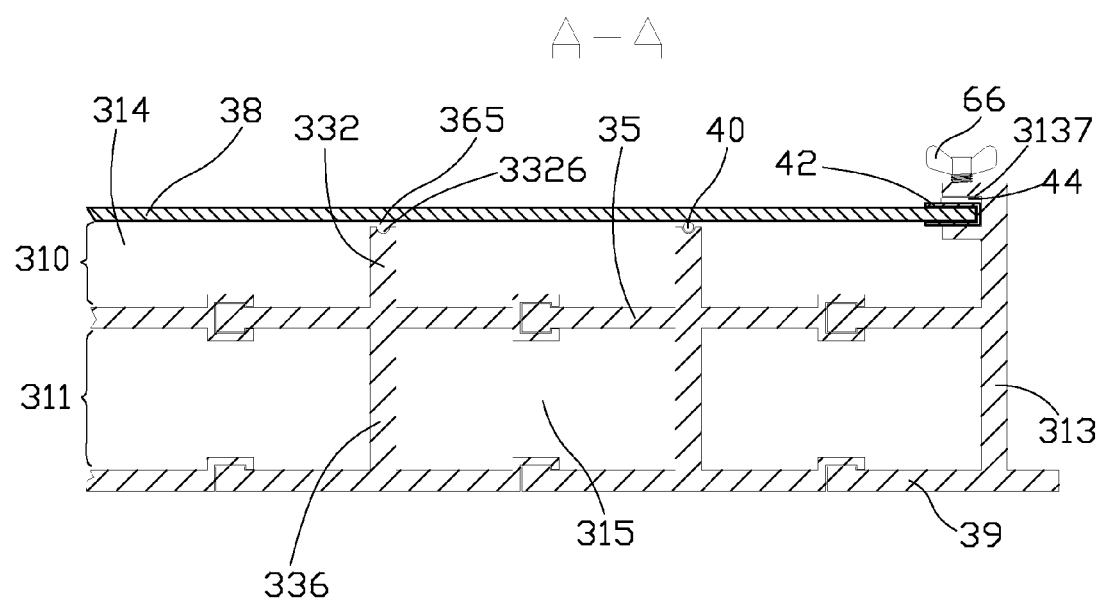
FIG. 9 is a cross-sectional view of the solar air conditioning device, taken along section A-A in FIG. 1.

Referring to FIG. 9, in assembly of the heat-absorbing units 32, the transparent panel 38 and the baffle members 312, 313. Two opposite ends of the transparent panel 38 orienting to the baffle members 312, 313 are covered with U-shaped soft beams 42. The ends of the transparent panel 38 are inserted into the rectangular protruding recesses 3127, 3137. Steel bars 44 are inserted into space between the upper portions of the rectangular recesses 3127, 3137 and the U-shaped soft beams 42. A plurality of screws 66 is inserted through the fixing holes 3138 of the baffle members 312, 313 to abut against the steel bar 44 so that the U-shaped soft beams 42 together with the end of the transparent panel 38 are securely attached in the recesses 3127, 3137. Thus, a waterproof configuration 60 between the inlet assembly 10, the transparent panel 38 and the outlet assembly 50 is formed. A plurality of air channels 314 is defined in the upper heat-retention cavities 310, which are defined by the transparent panel 38 the heat-absorbing plates 35. The heat-absorbing channels 315 are defined by the heat-absorbing plates 35 and the bottom boards 39. In order to reduce possible heat loss from the transparent panel 38, two approaches can be taken. The first approach is to close entrances and exits of the air channels 314 of the heat-retention cavities 310. The second approach is to reduce a height ratio between the upper support boards 332 and the lower support boards 336. Both of these approaches allow air to be heated mainly in the lower heat-absorbing channels 315. Therefore, since the solar air conditioning device 100 has only one transparent panel 38, most air goes through the lower heat-absorbing channels 315 and the device 100 demonstrates excellent heat insulation as well improving heating efficiency.

The transparent panels 38 can improve heat collection and retention of the solar air conditioning device 100 as sunshine can easily radiate through the transparent panel 38 but cannot escape through convection. Thus, solar energy can easily be absorbed by the heat-absorbing units 32 and used to heat air in the heat-absorbing channels 315; thus, the solar air conditioning device 100 has a wide surface for absorbing solar energy. The transparent panel 38 can be configured flat or corrugated. Material of the transparent panel 38 can be chosen from a group of glass, fiberglass, and plastic. The material of the transparent panel 38 should be transparent and weatherproof, and easily cut. It is therefore not necessary to attach the transparent panel 38 to a fixed outer frame insulation chamber (not shown) with a fixed envelop of a related solar air conditioning device (not shown). Thus, in the related solar air conditioning device, due to different coefficients of thermal expansion between the transparent panel and the fixed outer frame insulation chamber, components of the related solar air conditioning device tend to deform or break. The solar air conditioning device 100 without the fixed outer frame insulation chamber can avoid the problems described above. The solar collector assembly 30 can be assembled in a horizontal direction or a vertical direction, or an inclined direction.

A bottom of the solar collector assembly 30 is formed by the bottom boards 39 of the heat-absorbing units 32. The solar collector assembly 30 can be secured on a fixed object such as a roof (not shown) or a wall (not shown) by attaching the bottom boards 39 to the roof or the wall. The solar collector assembly 30 can also be fixed on a board (not shown) which is fixed to the fixed object at a distance or an angle. Beneath the heat-absorbing set 31, a heat-insulated layer (not shown) can be installed to prevent the roof from over-heating and reduce heat dissipation from the heat-absorbing set 31. Thus, heat in the heat-retention cavities 310 can be absorbed completely by the heat-absorbing plates 35, and then conducted to airflow in the heat-absorbing channels 315 below the heat-absorbing plates 35. Thus, a heating efficiency of the solar collector assembly 30 can be improved and thermal buoyancy of air increased.

Compared with a related solar collector assembly, the solar collector assembly 30 of the solar air conditioning device 100 including the modular heat-absorbing units 32, have many advantages, such as low packaging costs, small space required for storage and display, simple assembly and simple configuration. Moreover, the solar air conditioning device 100 can be transported easily through and assembled on site. Furthermore, the heat-absorbing units 32 can be designed or assembled according to requirements of users; thus, the solar air conditioning device 100 can be used in many different structures or houses. The solar collector assembly 30 can be extended to a big configuration easily as long as assemble more the heat-absorbing units 32, so that the solar air conditioning device 100 can have large heat-absorbing areas to collect solar energy. In addition, the heat-absorbing units 32 are suitable for mass-production so that the solar air conditioning device is both cheap and high quality.

Figure 10:
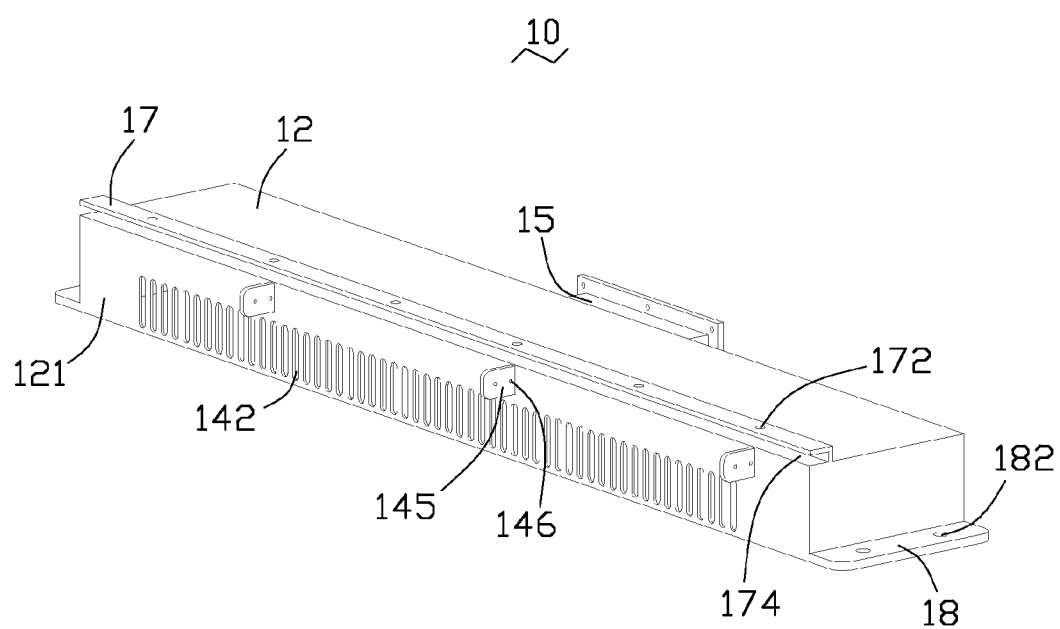
FIG. 10 is a schematic view of an inlet assembly of the solar air conditioning device of FIG. 1 in accordance with the present invention.
Figure 11:
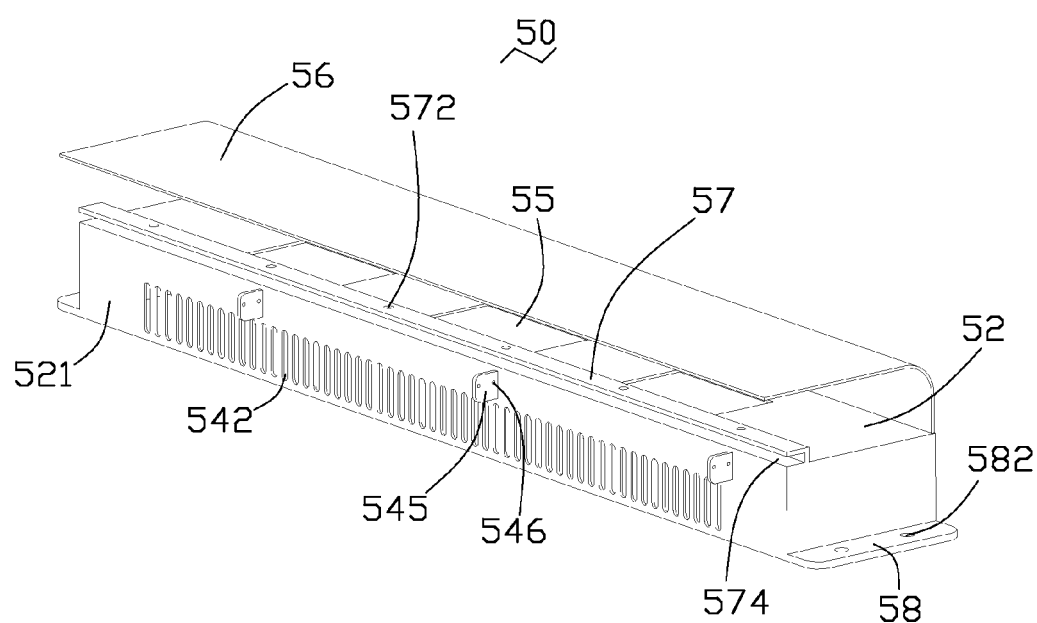
FIG. 11 is a schematic view of an outlet assembly of the solar air conditioning device of FIG. 1 in accordance with the present invention.

FIGS. 10 and 11 are respectively schematic views of the inlet assembly 10 and the outlet assembly 50 of the solar air conditioning device 100. As shown in FIG. 1, the inlet assembly 10 and the outlet assembly 50 are connected with an entrance (not labeled) and an exit (not labeled) of the solar air conditioning device 100 respectively, as the heat-absorbing channels 315 of the heat-absorbing cavities 311 of the solar collector assembly 30 communicate with the inlet assembly 10 and the outlet assembly 50. The inlet assembly 10 connects to interior exhaust pipes (not shown) and the outlet assembly 50 communicates with exterior. Stale air from the interior can be guided into the heat-absorbing channels 315 through the inlet assembly 10, then heated in the heat-absorbing channels 315 of the solar collector assembly 30, and finally expelled to the exterior through the outlet assembly 50. Meanwhile, cool and fresh air can be guided into the interior through other channels or devices. All in all, the solar air conditioning device 100 is good for health and for saving energy.

Referring to FIG. 2, FIG. 10 and FIG. 11, the inlet assembly 10 has a similar configuration with the outlet assembly 50. The inlet assembly 10 comprises a hollow and rectangular casing 12. The casing 12 has a folding wall 17 extending outwardly from a top portion thereof. The folding wall 17 is near an edge of the top portion of the casing 12 and forms a rectangular groove 174 opening to a front side of the casing 12. A plurality of mounting holes 172 are defined in a top portion of the folding wall 17. The casing 12 is secured to the solar collector assembly 30 by the folding wall 17 and sealed with the transparent panel 38. The casing 12 has a partition 121 in the front side thereof. A plurality of air holes 142 is defined in a lower half portion of the partition 121. The air holes 142 are arranged at predetermined intervals. A plurality of connecting portions 145 extends perpendicularly from an upper half portion of the partition 121. The connecting portions 145 are spaced from each other. Each connecting portion 145 has two mounting holes 146 defined therein. The casing 12 is connected with the heat-absorbing set 31 by extending screws (not shown) through the mounting holes 146 of the connecting portions 145 and the mounting holes 3322 of the support board 33 to threadedly engage with nuts (not shown). Two connecting projections 18 extend horizontally from a bottom portion of lateral sides of the casing 12. Each of the connecting projections 18 has two mounting holes 182 defined therein. The casing 12 can be secured to a roof, a wall or a fixed board by connecting projections 18. The casing 12 further has a hollow joint 15 in a rear side thereof. The joint 15 is used to connect to the indoor exhaust pipe. The outlet assembly 50 includes similar components to that of the inlet assembly 10, such as a casing 52, a partition 521, air holes 542, connecting portions 545, a folding wall 57, a rectangular groove 574, connecting projections 58 and mounting holes 546, 572, 582. A difference between the inlet assembly 10 and the outlet assembly 50 is that a plurality of rectangular air openings 55 is defined in a top portion of the casing 52 and a waterproof cover 56 extends outwardly from an edge of the top portion of the casing 52. Air in the casing 52 can be exchanged with the exterior through the air openings 55. The waterproof cover 56 covers the top portion of the casing 52 and is used to prevent irritants and pollutants such as, for example, dust or mosquitoes from entering into the casing 52.

When the heat-absorbing set 31 is attached to the inlet assembly 10 and the outlet assembly 50, the upper half portion of the partitions 121, 521 face toward the heat-retention cavities 310 and ensure that air in the heat-retention cavities 310 cannot flow into the inlet assembly 10 or the outlet assembly 50. The air holes 142, 542 in the lower half portion of the partitions 121, 521 communicate with the heat-absorbing channels 315; thus, air can be guided uniformly into the heat-absorbing channels 315 and heat-absorbing efficiency of the solar collector assembly 30 can be greatly improved. In order to reduce airflow resistance, the air holes 142 or the air holes 542 should preferably be twice as large as a cross-sectional area of inner holes of the indoor exhaust pipes.

Figure 12:
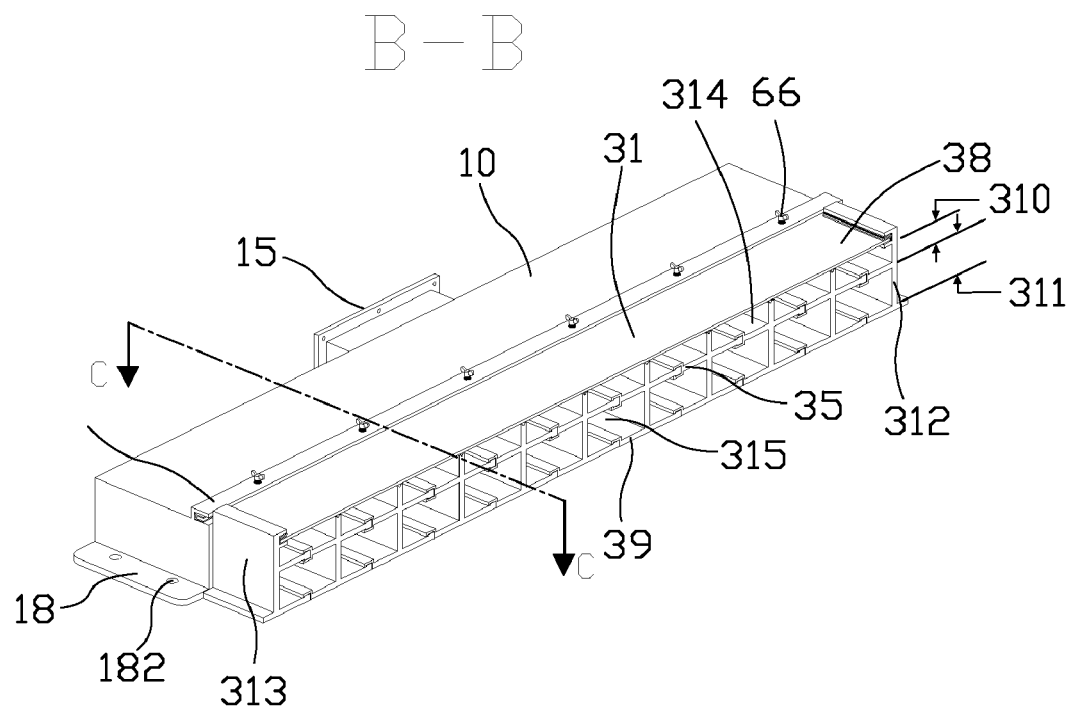
FIG. 12 is an isometric, cross-sectional view of a portion of the solar air conditioning device taken along section B-B in FIG. 1.
Figure 13:
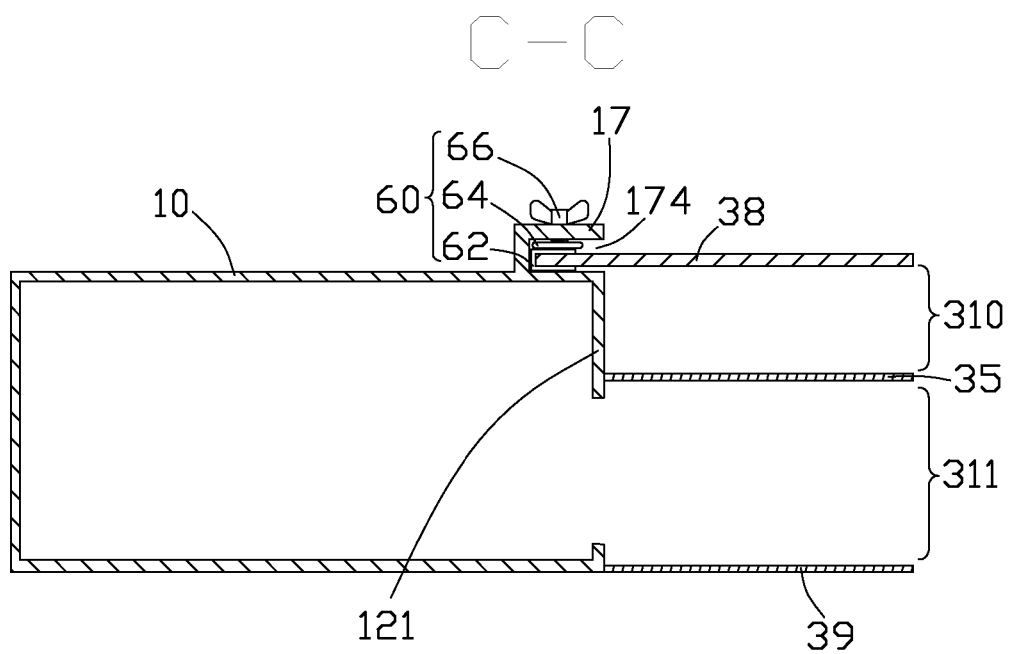
FIG. 13 is a cross-sectional view of the portion of the solar air conditioning device, taken along section C-C in FIG. 12.

FIG. 12 is a schematic view of a partial solar air conditioning device cut along line B-B of the solar air conditioning device 100 of FIG. 1. FIG. 13 is a cross-sectional view of the solar air conditioning device, taken along line C-C of FIG. 12. The inlet assembly 10 and the outlet assembly 50 have an essentially identical waterproof configuration 60 to the transparent panel 38. For example, in the inlet assembly 10, the waterproof configuration 60 between the inlet assembly 10 and the transparent panel 38 comprises a U-shaped soft beam 62, a steel bar 64 and a plurality of screws 66. After the connecting portions 145, 545 are connected to the support board 33 near two ends of the heat-absorbing set 31, the end of the transparent panel 38 covered with the U-shaped soft beams 62 is inserted into the rectangular groove 174; then, the steel bar 64 is inserted into space between the upper portion of the rectangular groove 174 and the U-shaped soft beams 62; then, the screws 66 are inserted through the mounting holes 172 of the folding wall 17 to abut against the steel bar 64 so that the U-shaped soft beams 62 together with the end of the transparent panel 38 are securely attached in the rectangular groove 174. Thus, the waterproof configuration 60 between the inlet assembly 10 and the transparent panel 38 is formed. The waterproof configuration 60 between the outlet assembly 50 and the transparent panel 38 can be attained in a similar way.

Figure 14:
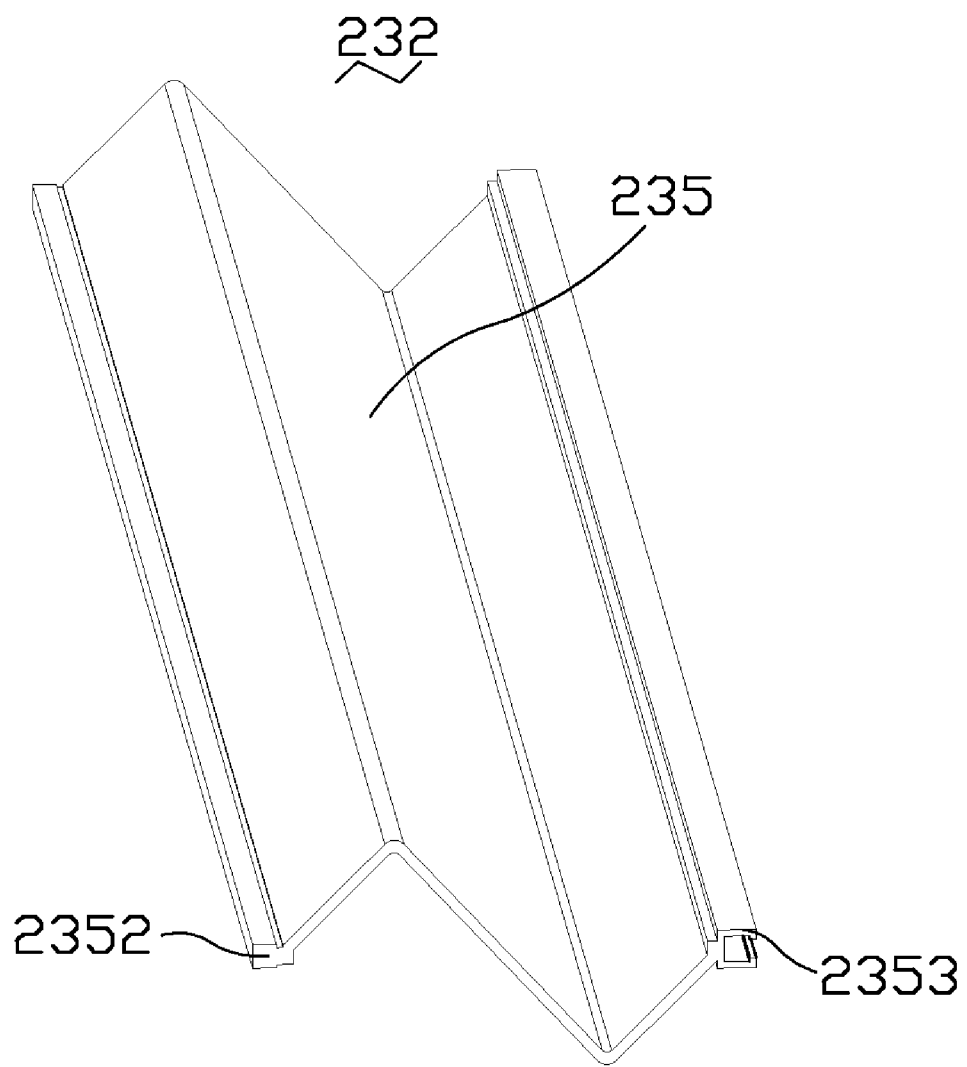
FIG. 14 is a schematic view of a heat-absorbing unit in accordance with a second embodiment of the present invention.
Figure 15:
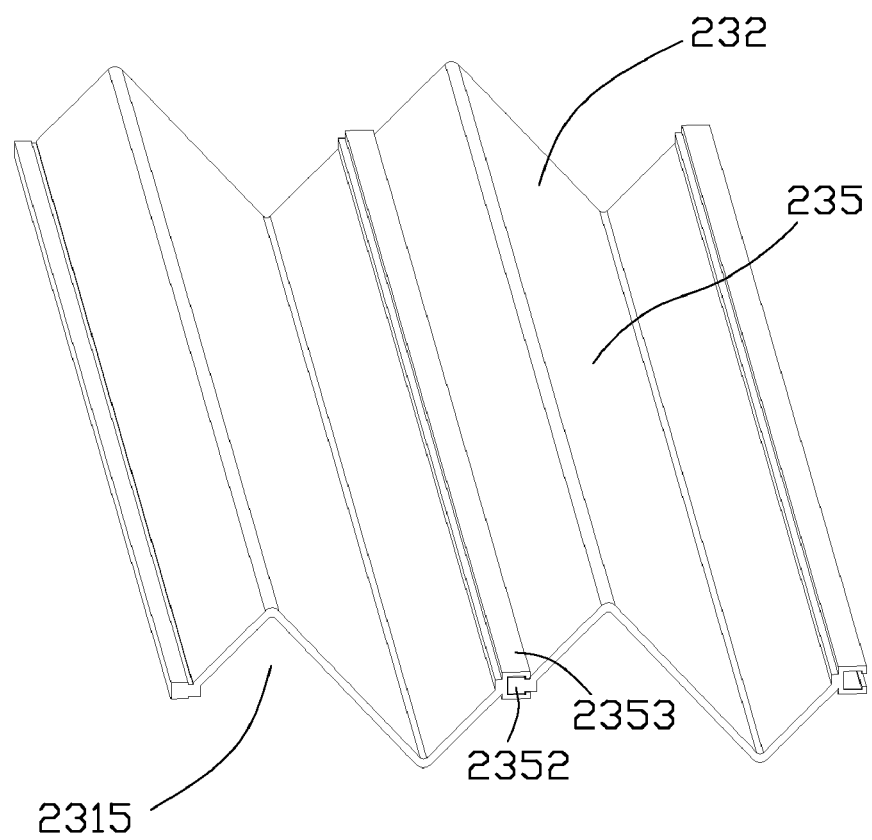
FIG. 15 is a schematic view of adjacent two of the heat-absorbing units in FIG. 14 assembled together.

Referring to FIG. 14, a heat-absorbing unit 232 in accordance with a second embodiment of the present invention is shown. FIG. 15 is an assembled, schematic view of two heat-absorbing units 232 assembled together by themselves. Each of the heat-absorbing units 232 comprises an N-shaped heat-absorbing plate 235. The heat-absorbing plate 235 is formed by bending a flat plate. A plurality of angled grooves (not labeled) are defined in the heat-absorbing plate 235. Two fasteners 2352, 2353 are formed from two extending ends of the heat-absorbing plate 235 respectively in the longitudinal direction. The fasteners 2352, 2353 are similar to the fasteners 352, 353 of the heat-absorbing unit 32. The fasteners 2352 are used to engage with the fasteners 2353, thus heat-absorbing units 232 are assembled together. A solar air conditioning device (not shown) using the heat-absorbing units 232 further comprises a transparent panel (not shown) and a shared bottom board (not shown). The transparent panel and the heat-absorbing units 232 form a plurality of upper heat-retention cavities (not shown). The heat-absorbing units 232 and the shared bottom board form a plurality of lower heat-absorbing cavities (not shown). The heat-absorbing cavities define a plurality of heat-absorbing channels 2315 therein. The solar air conditioning device using the heat-absorbing units 232 has the following advantages: (1) Uses less material, as the heat-absorbing units 232 can be used as a support board; (2) Has high heat-absorption efficiency, as the N-shaped heat-absorbing plate 235 has a larger surface for absorbing solar energy than the flat heat-absorbing plate 35; (3) Involves fewer manufacture processes, the upper heat-retention cavities can communicate with each other through gaps between the transparent panel and tops of the heat-absorbing plates 235. As bottoms of the heat-absorbing plate 235 abut against the shared bottom board, the heat-absorbing cavities can communicate with each other through gaps between the heat-absorbing plates 235 and the shared bottom board.

Two protruding plates (not shown) can be mounted on top and bottom of the heat-absorbing units 232 along the heat-absorbing channels 2315. A plurality of air holes (not shown) is defined in the plates for providing passage of airflow. A plurality of soft gaskets (not shown) is mounted on two opposite edges of the plates to prevent water from entering into the solar collector assembly. The heat-absorbing unit 232 can be M-shaped by extending two transverse ends thereof.

Figure 16:
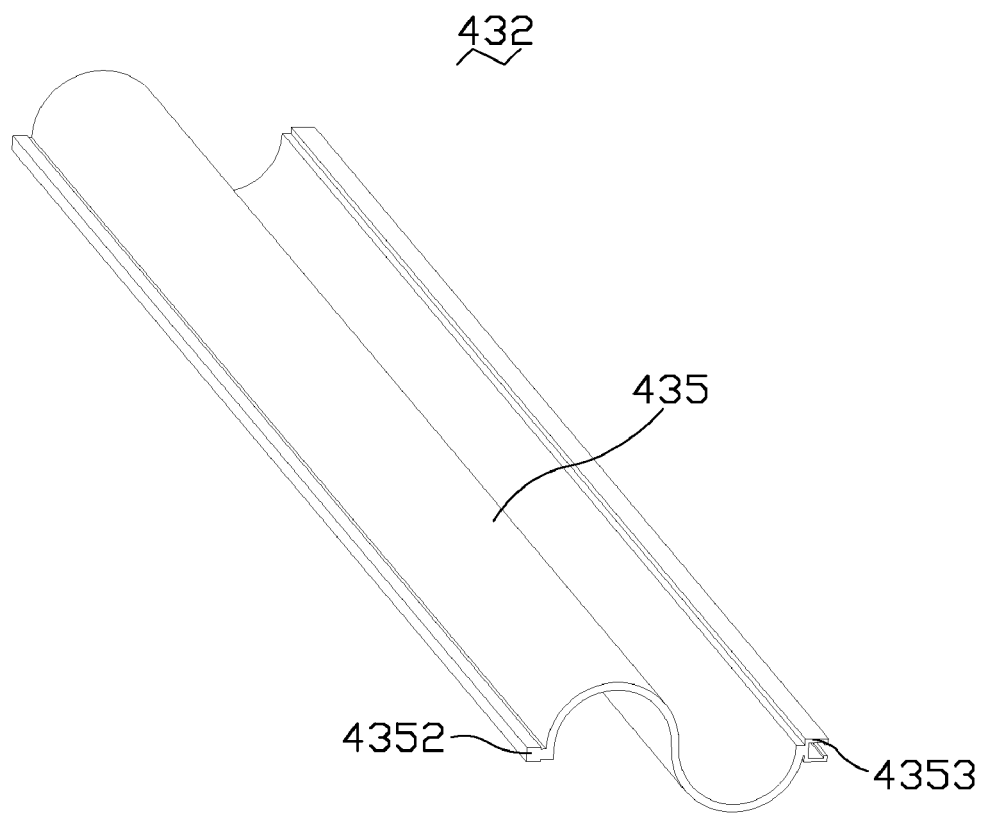
FIG. 16 is a schematic view of a heat-absorbing unit in accordance with a third embodiment of the present invention.
Figure 17:
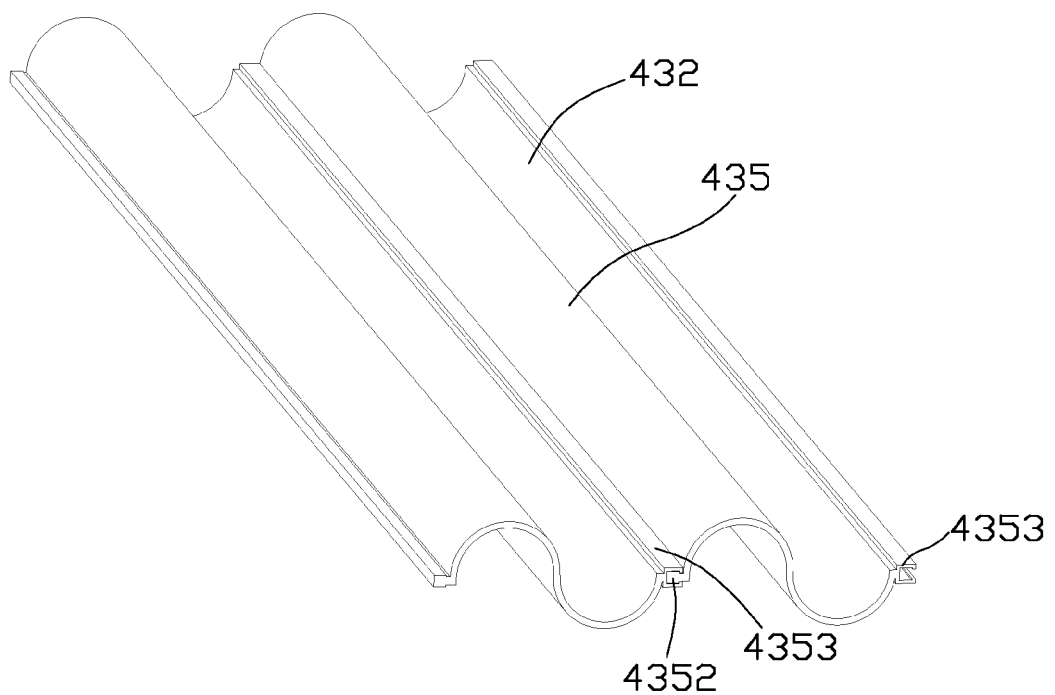
FIG. 17 is a schematic view of adjacent two of the heat-absorbing units in FIG. 16 assembled together.

Referring to FIG. 16, a heat-absorbing unit 432 in accordance with a third embodiment of the present invention is shown. FIG. 17 is an assembled, schematic view of two heat-absorbing units 432 assembled together by themselves. Each of the heat-absorbing units 432 comprises an S-shaped heat-absorbing plate 435. The heat-absorbing plate 435 is formed by bending a flat plate. A plurality of angled grooves (not labeled) is defined in the heat-absorbing plate 435. Two fasteners 4352, 4353 are formed from two extending ends of the heat-absorbing plate 235 respectively in the longitudinal direction. The fasteners 4352, 4353 are similar to the fasteners 352, 353 of the heat-absorbing unit 32. The fasteners 4352 are used to engage with the fasteners 4353, thus heat-absorbing units 432 are assembled together.

In summer, the solar air conditioning device 100 can heat stale air guided from the interior exhaust pipes connecting with a room (not shown) and expel the heated stale air out of the room using thermal buoyancy. At the same time, cool and fresh air from the exterior can be guided into the room, or air from the exterior can be cooled and guided into the room through other devices (not shown) or channels (not shown). Thus, in summer, air in the room can be kept fresh and cool all the time.

In winter, air through the interior exhaust pipes can be heated in the solar collector assembly 30 of the solar air conditioning device 100 and guided to the room via a fan (not shown) connected with the interior exhaust pipes. Furthermore, when fresh air from the exterior is guided to mix with air in the interior exhaust pipes and further heated in the solar collector assembly 30, the inlet assembly 10 should communicate with the interior exhaust pipes and the air openings 55 of the casing 52 should be opened. The fan draws the fresh air through the solar air conditioning device 100 to the indoor room.

The solar air conditioning assembly 100 can be installed with a hot water supply system (not shown) which can operate year-round. A plurality of heat-absorbing water pipes (not shown) are arranged in the heat-retention cavities 310 of the solar air conditioning assembly 100, then heated water is transferred back to a water circulation circuit (not shown) including a heat storage tank (not shown). Meanwhile, air is heated in the heat-absorbing channels 315 of the solar air conditioning assembly 100.

The solar air conditioning assembly 100 in accordance with the present invention has many features that are superior to the related solar air conditioning assemblies. With its modular design, the solar air conditioning assembly 100 provides users with greater compatibility in application as well as more selection and freedom in assembly. The solar air conditioning assembly 100 can be installed in all kinds of structures and vehicles, including ones that are under construction or currently existing ones. The solar air conditioning assembly 100 can be installed horizontally or vertically attached to walls. Furthermore, it can be installed at an angle. The solar air conditioning assembly 100 can also provide excellent heat insulation and protection to the structure.

The heat-absorbing units 32, 232, 432 used in the solar air conditioning assembly 100 can be flexibly expanded as desired to the most optimal absorption surface area to fully absorb and collect heat energy. Therefore, the solar air conditioning assembly 100 does not need a fixed outer frame insulation chamber like the one used in the related solar air conditioning assembly. The solar air conditioning assembly 100 also needs no special consideration for the heat efficiency of each individual unit, as the related models do. One special feature of the solar air conditioning assembly 100 is that although it only has one layer of transparent panel in its structure, because most air goes through the lower heat-absorbing channels 315, the assembly 100 has the excellent insulation effect of a double-glazed system and very high heat-absorption efficiency.

Compared with the related models, the solar air conditioning assembly 100 has a lighter and thinner structure and appearance, and thus it does not cause an overly heavy load to structures. The commercially available flat transparent panel 38 and corrugated transparent panel can maintain the harmony and aesthetics of the existing structures. Furthermore, since the installation of the transparent panel 38 does not have to be glazed into the outer frame of the heat-insulated chamber as one must in the related model, the thermal expansion coefficient of materials used in the solar air conditioning assembly 100 will not cause thermal stress problems related to deformation or cracking.

The solar air conditioning assembly 100 is designed according to a modular concept. Cost of the solar air conditioning assembly 100 is greatly reduced because the heat-absorbing units 32, 232, 432 are made of thin boards and plates. The solar air conditioning assembly 100 is much simpler than related assemblies with whole-unit designs. The assembly not only saves expenses in packaging but also requires less room for display and storage to make channel marketing much easier. The solar air conditioning assembly 100 is very easy to install and maintain such a system. Moreover, users can install and assemble the system by themselves.

What is claimed is:

1. A solar air conditioning device comprising:
a solar collector assembly, having:
a heat-absorbing set comprising a plurality of heat-absorbing units, each of the heat-absorbing units comprising a heat-absorbing plate and a bottom board, fasteners and fixtures formed at two opposite lateral sides of the heat-absorbing plate and the bottom board, the heat-absorbing units assembled side by side by engagement between the fasteners and fixtures of every adjacent two heat-absorbing units in a transverse direction; and
a transparent panel assembled to a top of the heat-absorbing set, an air channel defined between the transparent panel and the heat-absorbing set, and a heat-absorbing channel defined below the air channel and hermetical from the air channel;
an inlet assembly installed at an entrance of the solar collector assembly; and
an outlet assembly installed at an exit of the solar collector assembly, wherein the inlet and outlet assemblies communicate with opposite ends of the heat-absorbing channel, respectively, whereby air can flow from the inlet assembly to the outlet assembly via the heat-absorbing channel and vice versa;
wherein in a longitudinal direction, a distance between the inlet assembly and the outlet assembly is equal to a longitudinal length of the heat-absorbing plate of single heat-absorbing unit;
wherein two baffle members are mounted on opposite two sides of the heat-absorbing set in a manner such that the baffle members, the inlet and outlet assemblies cooperatively enclose the heat-absorbing set; and
wherein the baffle members form fasteners and fixtures orienting to the heat-absorbing set, for engaging with corresponding fasteners and fixtures of two heat-absorbing units located at two opposite outmost transverse sides of the heat-absorbing unit, and wherein the fasteners and the fixtures of the two heat-absorbing units and baffle members are shaped to be rectangular grooves and rods for engagement with each other.

2. The solar air conditioning device as claimed in claim 1, wherein each of the heat-absorbing units further comprises a support board, the bottom board parallel to the heat-absorbing plate and located below the heat-absorbing plate, the support board perpendicular to the bottom board extending upwardly from the heat-absorbing plate and the bottom board.

3. The solar air conditioning device as claimed in claim 2, wherein the support board comprises an upper support board above the heat-absorbing plate and a lower support board below the heat-absorbing plate.

4. The solar air conditioning device as claimed in claim 2, wherein the fasteners are formed two opposite edges of the heat-absorbing plate of the heat-absorbing unit, and the fixtures are formed two opposite edges of the bottom board of the heat-absorbing unit.

5. The solar air conditioning device as claimed in claim 2, wherein the fasteners and fixtures located a same side of the support board are shaped to be rectangular grooves, and the fasteners and fixtures located another same side of the support board are shaped to be rectangular rods engaged in the corresponding grooves of every two adjacent heat-absorbing units.

6. The solar air conditioning device as claimed in claim 1, wherein a protruding recess located above the fasteners of each of the baffle members is defined for providing an insertion of an edge of the transparent panel.

7. The solar air conditioning device as claimed in claim 1, wherein the heat-absorbing units are S-shaped.

8. The solar air conditioning device as claimed in claim 1, wherein the heat-absorbing units are N-shaped.

9. The solar air conditioning device as claimed in claim 2, wherein the support board defines a plurality of air holes for improving heat absorbing efficiency of the heat-absorbing channel.

* * * * *